(12) United States Patent
Matsumoto et al.

(10) Patent No.: US 7,463,240 B2
(45) Date of Patent: Dec. 9, 2008

(54) HAPTIC INPUT DEVICE

(75) Inventors: Ken Matsumoto, Iwate-ken (JP); Satoshi Hayasaka, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 527 days.

(21) Appl. No.: 11/070,753

(22) Filed: Mar. 2, 2005

(65) Prior Publication Data

US 2005/0195167 A1    Sep. 8, 2005

(30) Foreign Application Priority Data

Mar. 5, 2004  (JP) ............................. 2004-062498

(51) Int. Cl.
*G09G 5/08* (2006.01)

(52) U.S. Cl. .................. 345/157; 345/158; 345/161; 345/163; 345/167

(58) Field of Classification Search .............. 345/156, 345/690, 157, 158, 161, 163, 167, 168, 184, 345/173, 145, 146; 341/20, 27, 34, 35; 700/85, 700/203, 217, 219
See application file for complete search history.

(56) References Cited

U.S. PATENT DOCUMENTS

| | | | |
|---|---|---|---|
| 5,381,080 A | | 1/1995 | Schnell et al. |
| 5,825,308 A | * | 10/1998 | Rosenberg .................. 341/20 |
| 6,154,201 A | | 11/2000 | Levin et al. |
| 6,161,126 A | * | 12/2000 | Wies et al. ................. 709/203 |
| 6,219,032 B1 | * | 4/2001 | Rosenberg et al. .......... 345/157 |
| 6,353,850 B1 | * | 3/2002 | Wies et al. .................. 709/203 |
| 6,697,044 B2 | * | 2/2004 | Shahoian et al. ........... 345/156 |
| 7,006,074 B2 | * | 2/2006 | Chesters .................... 345/156 |
| 7,206,627 B2 | * | 4/2007 | Abovitz et al. ............. 600/407 |
| 7,340,416 B1 | * | 3/2008 | Larabee et al. ............... 705/26 |
| 2001/0002126 A1 | * | 5/2001 | Rosenberg et al. .......... 345/156 |
| 2001/0040553 A1 | * | 11/2001 | Rosenberg .................. 345/158 |
| 2002/0109668 A1 | | 8/2002 | Rosenberg et al. |
| 2003/0122779 A1 | * | 7/2003 | Martin et al. ............... 345/156 |
| 2004/0108992 A1 | * | 6/2004 | Rosenberg .................. 345/156 |
| 2004/0257380 A1 | * | 12/2004 | Herbert et al. .............. 345/619 |
| 2005/0099387 A1 | * | 5/2005 | Matsumoto et al. ......... 345/157 |
| 2005/0099388 A1 | * | 5/2005 | Matsumoto .................. 345/157 |
| 2005/0197800 A1 | * | 9/2005 | Goodwin et al. ............ 702/152 |

(Continued)

FOREIGN PATENT DOCUMENTS

| | | |
|---|---|---|
| EP | 0 498 540 | 8/1992 |
| JP | 7-120247 | 12/1995 |
| WO | WO 02/23322 | 3/2002 |

OTHER PUBLICATIONS

Search Report dated Jan. 24, 2007 for corresponding European Patent Application No. 05 00 4682.

*Primary Examiner*—Prabodh M Dharia
(74) *Attorney, Agent, or Firm*—Brinks Hofer Gilson & Lione

(57) ABSTRACT

On two buttons displayed adjacent to each other on a display means, when a cursor moves from the center position of a first button to the center position of a second button, an attractive force exerted in the direction opposite to the moving direction of the cursor in an attractive area is increased to be larger than a normal attractive force. Therefore the cursor can move to the desired button easily and surely.

7 Claims, 8 Drawing Sheets

U.S. PATENT DOCUMENTS

2005/0259076 A1* 11/2005 Hayasaka et al. ........... 345/161
2006/0109256 A1* 5/2006 Grant et al. ................. 345/173
2007/0067104 A1* 3/2007 Mays ......................... 701/211
2007/0139375 A1* 6/2007 Rosenberg et al. .......... 345/161
2007/0229455 A1* 10/2007 Martin et al. ............... 345/156

* cited by examiner

HAPTIC INPUT DEVICE

This application claims the benefit of priority to Japanese Patent Application No. 2004-062498, filed on Mar. 5, 2004, herein incorporated by reference.

BACKGROUND OF THE INVENTION

1. Field of the Invention

The present invention relates to a haptic input device used for, for example, car navigation systems etc. and, in particular, to an operability-improving means of an input device having a function of automatically attracting the cursor into an attractive point set on the menu-selection buttons displayed on display means in order to facilitate the selection of a desired button.

2. Description of the Related Art

Input devices are known in which display means displays menu-selection buttons and the cursor, and input means allows an operator to select a desired menu by moving the cursor to the displayed position of the desired button. In addition, some input means have a function that automatically attracts the cursor to an attractive point set on the button to facilitate the movement of the cursor to the displayed position of a desired button.

FIG. 8 is a block diagram of a known input device having an automatic cursor-attracting function. This input device includes an input means 101 which is operated by the operator and detects the amount of movement for itself; a display means 102 which displays a cursor moved by the input means 101 and input points (buttons), position-detecting means 103 which extracts the coordinates of the cursor displayed on the display means 102 from the amount of movement of the input means 101; and a driving means 104 which applies force to the input means 101 in accordance with the coordinates of the cursor. The input means 101 includes a rolling ball 105 which rolls on a desk, and a rotating angle-detecting means 106, 107 disposed in accordance with the x and y-axis of the display means 102 in order to detect the rotating amount of the rolling ball 105 in the x-axis direction and in the y-axis direction. The driving means 104 includes a driving unit 108 composed of motors 108a, 108b to drive the rolling ball 105 and a driving-signal generation unit 109 for generating driving signals of the driving unit 108 in accordance with signals from the position-detecting means 103 (refer to, for example, Japanese Examined Patent Application Publication No. 7-120247)

As shown in the lower part of FIG. 9, the driving signal generation unit 109 pre-stores the relationship among a relative distance between the cursor and the input point, a relative moving direction of the cursor towards the input point, and a driving signal supplied to the driving unit 108. As shown in the upper part of FIG. 9, when the cursor moves towards the input point by the operation of the input means 101 and the cursor enters the range of x1≦x≦x2, the driving signal "+1" shown in the lower part of FIG. 9 is supplied to the driving unit 108 by the driving-signal generation unit 109. Accordingly a driving force is applied to the rolling ball 105 so that such a sensation is provided to the input means 101 that the rolling ball 105 is attracted to the input point, as shown in the middle part of FIG. 9, and the cursor is attracted to the input point. In contrast, when the cursor moves away from the input point by the operation of the input means 101, and the cursor enters the range of x3≦x≦x4, the driving signal "−1" shown in the lower part of FIG. 9 is supplied to the driving unit 108 by the driving signal generation unit 109. Accordingly, a resistive force is applied to the rolling ball 105 so that such a sensation is provided to the input means 101 that the rotating ball 105 is pulled back to the input point.

Therefore, an input device of the above-described structure facilitates the operation with which the cursor moves to the desired input point. For example, this input device facilitates the menu selection displayed on the display means 102.

Meanwhile, as described in Patent Document 1, it is common that a plurality of menu selection buttons (input points) is disposed on the display means in various arrangements. However, the technology described in Patent Document 1 does not suppose the control of the attractive force when a plurality of buttons is displayed on the display means, in particular, when the buttons are closely located to one another. Therefore, if the technology described in Patent Document 1 is applied to an actual device, the input means may be influenced by the attractive force exerted toward the button that the cursor located before when the cursor moves from the displayed position of one button to that of the other, thus the operability of the input means becomes degraded, and the cursor cannot be smoothly moved to the desired button.

Specifically, as shown in the upper part of FIG. 10, if the configuration is such that first to third buttons B1, B2 and B3 are displayed in one line at regular intervals on the display means, and cursor-attractive areas A1, A2 and A3 are separately set up around each button B1, B2 and B3, a given attractive force is applied to the input means 101 in accordance with the distance from the attractive point (in the this case, the center positions O1, O2 and O3 of each button B1, B2 and B3) set in the attractive area where the cursor C enters to the current position of the cursor C when the cursor C is moved to one of the cursor-attractive areas A1, A2 and A3, and when the cursor C crosses the buttons B1, B2 and B3 one after another, the attractive force applied to the input means 101 is changed like the lower part of FIG. 10.

And, when the cursor moves from the attractive point O1 of the first button B1 to the attractive point O2 of the second button B2, an attractive force in accordance with the distance from the attractive point O1 to the current position of the cursor C is applied to the input means 101 while the cursor C moves from the attractive point O1 of the first button B1 to the borderline between the first attractive area A1 and the second attractive area A2, thus the operator exerts a large force on the input means 101 against this attractive force. And as soon as the cursor C crosses the borderline, the attractive force exerted toward the attractive point O1 is removed, and the attractive force in accordance with the distance from the attractive point O2 to the current position of the cursor C is applied to the input means 101. In this case, if the second button B2 is a button desired to select, the operator is required to weaken the force exerted on the input means 101. However, actually, the operator does not stop exerting the force against the attractive force exerted toward the attractive point O1, thus the cursor C can cross the borderline between the second attractive area and the third attractive area and enter the third attractive area A3.

That is, the operator continues to exert force in the moving direction of the cursor even after the attractive force exerted in the direction opposite to the moving direction of the cursor is removed, thus the cursor C can move to the outside of the attractive area of the desired button.

The present invention is devised to solve the afore-mentioned problem. Therefore the objective of the present invention is to provide a haptic input device in which the cursor does not move to the outside of the attractive area of the desired button when it moves among a plurality of buttons having an attractive area formed around each button.

SUMMARY OF THE INVENTION

To solve the above-described problem, the present invention comprises a display means for displaying the cursor and a plurality of buttons; an input means consisting of an operating unit, an operating amount-detecting unit which detects the operating amount of the above-described operating unit, and an actuator which applies a required feedback force to the above-described operating unit; and a control means for controlling the display of the cursor based on the operating amount signal from the above-described operating amount-detecting unit and for controlling the driving of the above-described actuator to apply a given attractive force exerted on the operating unit toward the above-described button based on the positional relationship between the above-described cursor and the above-described buttons, and the above-described control means increases the attractive force exerted toward the desired button to be larger than a given attractive force when the cursor moves from the attractive area that the cursor located before which attracts the cursor to the old button displayed on the display means to the attractive area which attracts the cursor to the desired button displayed on the display means.

In such a configuration, even when the operator continues to exert a force against the attractive force of the first attractive area (resistive force) after the cursor crosses the borderline between the first attractive area and the second attractive area, the cursor can not protrude to the outside of the second attractive area because the attractive force of the second attractive area (resistive force) is increased.

Further, in the input device of the above-described configuration, the control means of the present invention sets the increment time of the attractive force exerted toward the desired button whenever the cursor moves to the second attractive area from the first attractive area, and restores the above-described attractive force to the normal attractive force after the increment time elapses.

In such a configuration, the attractive force exerted toward the desired button which has been once increased is restored to the given attractive force after the given time, thus the cursor can be moved out from the current attractive area with a normal force.

Further, in the input device of the above-described configuration, the control means of the present invention increases only the attractive force exerted in the direction opposite to the moving direction of the cursor among the attractive force of the desired button.

In such a configuration, among the attractive force exerted toward the desired button, the attractive force exerted in the moving direction of the cursor is maintained to the predetermined given attractive force, thus the attractive force exerted on the operating unit toward the desired button (propulsive force) is not increased when the cursor moves from the first attractive area to the second attractive area, and thus the cursor can be prevented more easily from moving out to the outside of the second attractive area.

Further, in order to solve the above-described problem, the present invention comprises a storage means for storing an indicating position and a plurality of functional areas; an input means consisting of an operating unit, an operating amount-detecting unit which detects the operating amount of the operating unit and an actuator which applies a required feedback force to the operating unit; and a control means for calculating the indicating position based on the operating amount and for controlling the driving of the above-described actuator to apply a given attractive force exerted toward the above-described functional area based on the positional relationship between the above-described indicating position and the above-described functional area, and the above-described control means increases the attractive force exerted toward the desired functional area larger than a given attractive force when the above-described indicating position moves from the first attractive area which attracts the indicating position to the functional area that the indication position located before to the desired functional area which attracts the indicating position to the desired functional area.

In such a configuration, even when the operator continues to exert force to overcome the attractive force of the first attractive area (resistive force) after the indicating position crosses the borderline between the first attractive area and the second attractive area, the indicating position can be prevented from moving to the outside of the second attractive area because the attractive force exerted toward the second attractive area (resistive force) is increased.

Further, in the input device of the above-described configuration, the control means of the present invention sets the increment time of the attractive force exerted toward the desired functional area whenever the indicating position moves to the second attractive area from the first attractive area, and restores the above-described attractive force to the normal attractive force after the increment time elapses.

In such a configuration, the attractive force exerted toward the desired button which has been once increased is restored to the given attractive force after the given time, thus the indicating position can be moved out from the current attractive area with a normal force.

Further, in the input device of the above-described configuration, the control means of the present invention increases only the force exerted in the direction opposite to the moving direction of the indicating position among the attractive force exerted toward the desired functional area.

In such a configuration, among the attractive force exerted toward the desired functional area, the attractive force exerted in the moving direction of the indicating position is maintained at the predetermined attractive force, thus the attractive force (propulsive force) exerted on the operating unit toward the second attractive area is not increased when the indicating position moves from the first attractive area to the second attractive area, and the indicating position can be prevented more easily from moving out to the outside of the second attractive area.

In the haptic input device of the present invention, when the cursor moves from the first attractive area which attracts the cursor to a first button displayed on the display means to the second attractive area which attracts the cursor to a second button displayed on the display means, the control means increase the attractive force exerted toward the second button so that the attractive force is larger than the predetermined attractive force. Thus, even when the operator continues to exert a force against the attractive force exerted toward the first attractive area (resistive force) after the cursor crosses the borderline between the first attractive area and the second attractive area, the attractive force (resistive force) in the second attractive area is increased. Therefore, the cursor can be prevented from deviating from the second attractive area.

DESCRIPTION OF THE PREFERRED EMBODIMENTS

Figure 1:
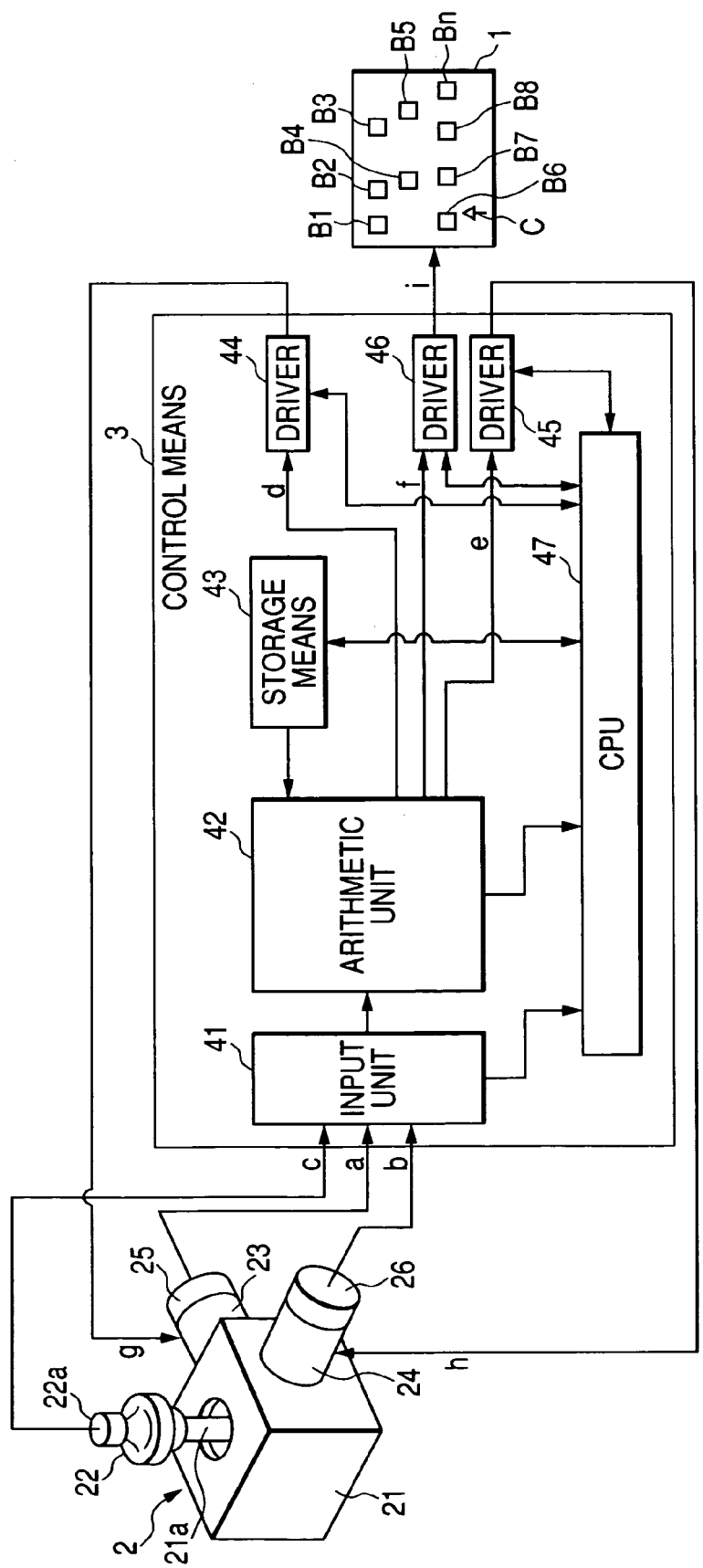
FIG. 1 is a schematic diagram of a haptic input device according to the present embodiment.
Figure 2:
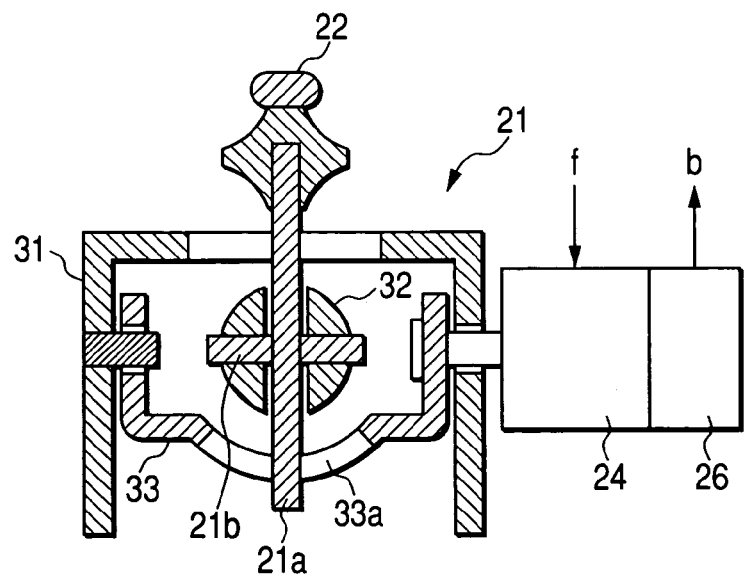
FIG. 2 is a side cross-sectional view of the haptic input device according to the present embodiment.
Figure 3:
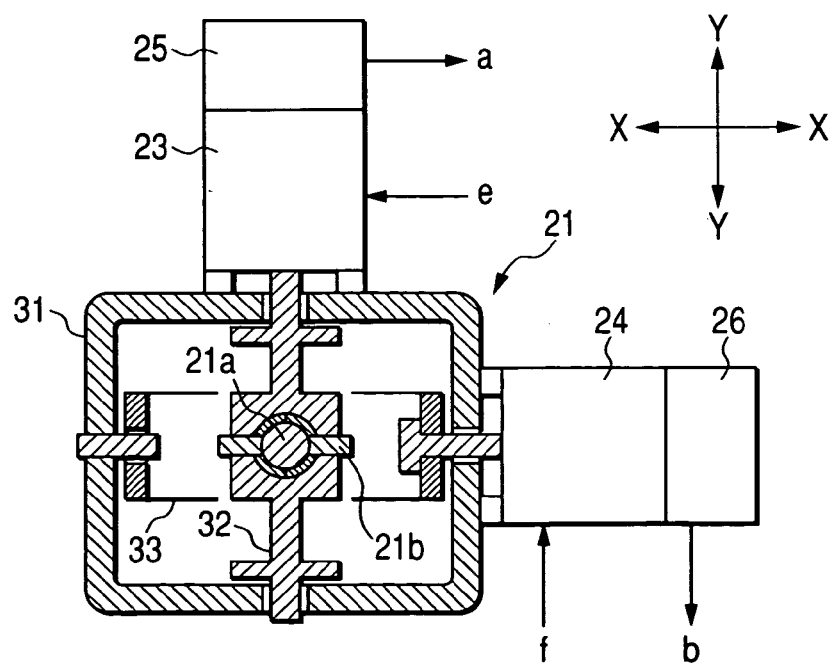
FIG. 3 is a plan cross-sectional view of the input means according to the present embodiment.
Figure 5:
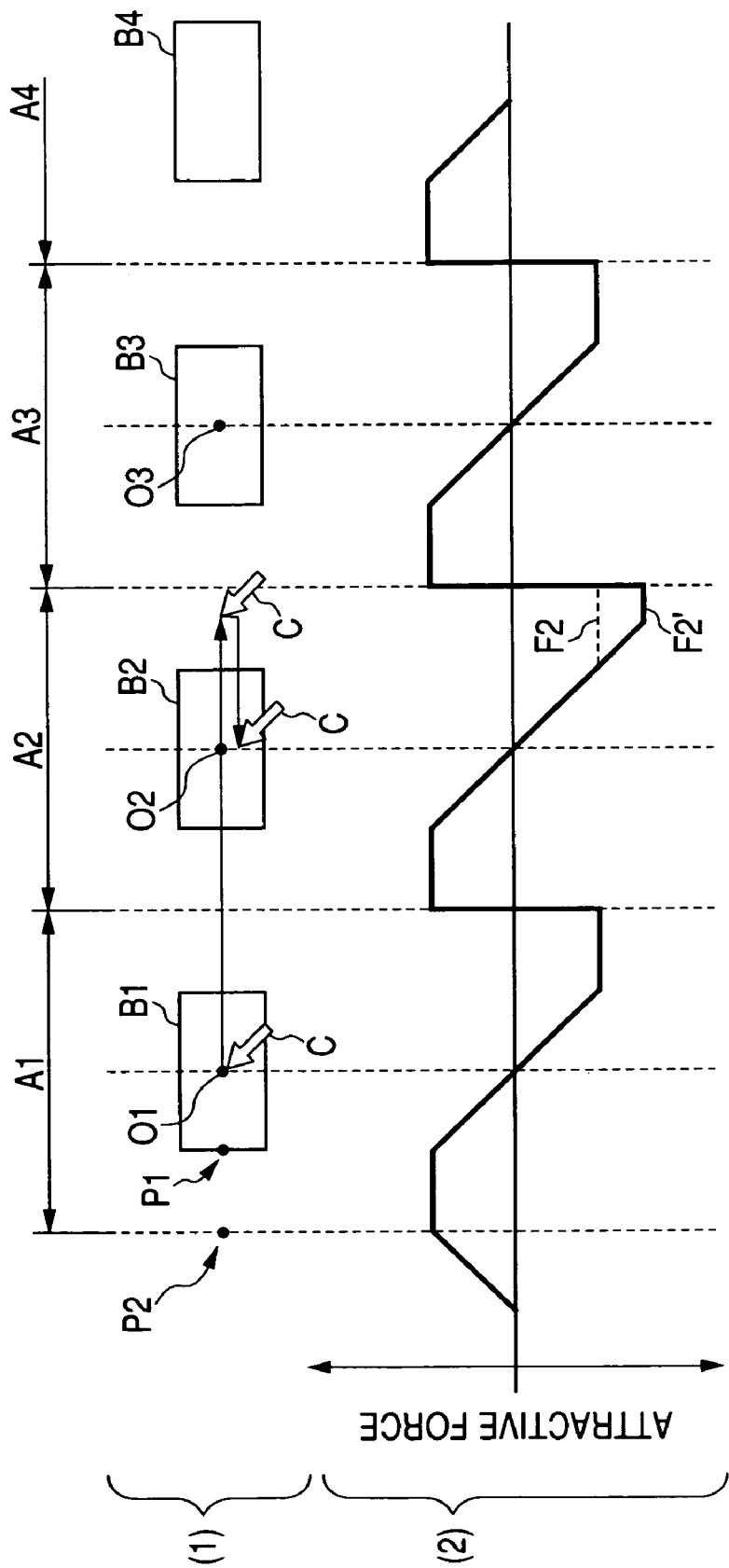
FIG. 5 is a graph illustrating the change in the attractive force in the position of a cursor.
Figure 6:
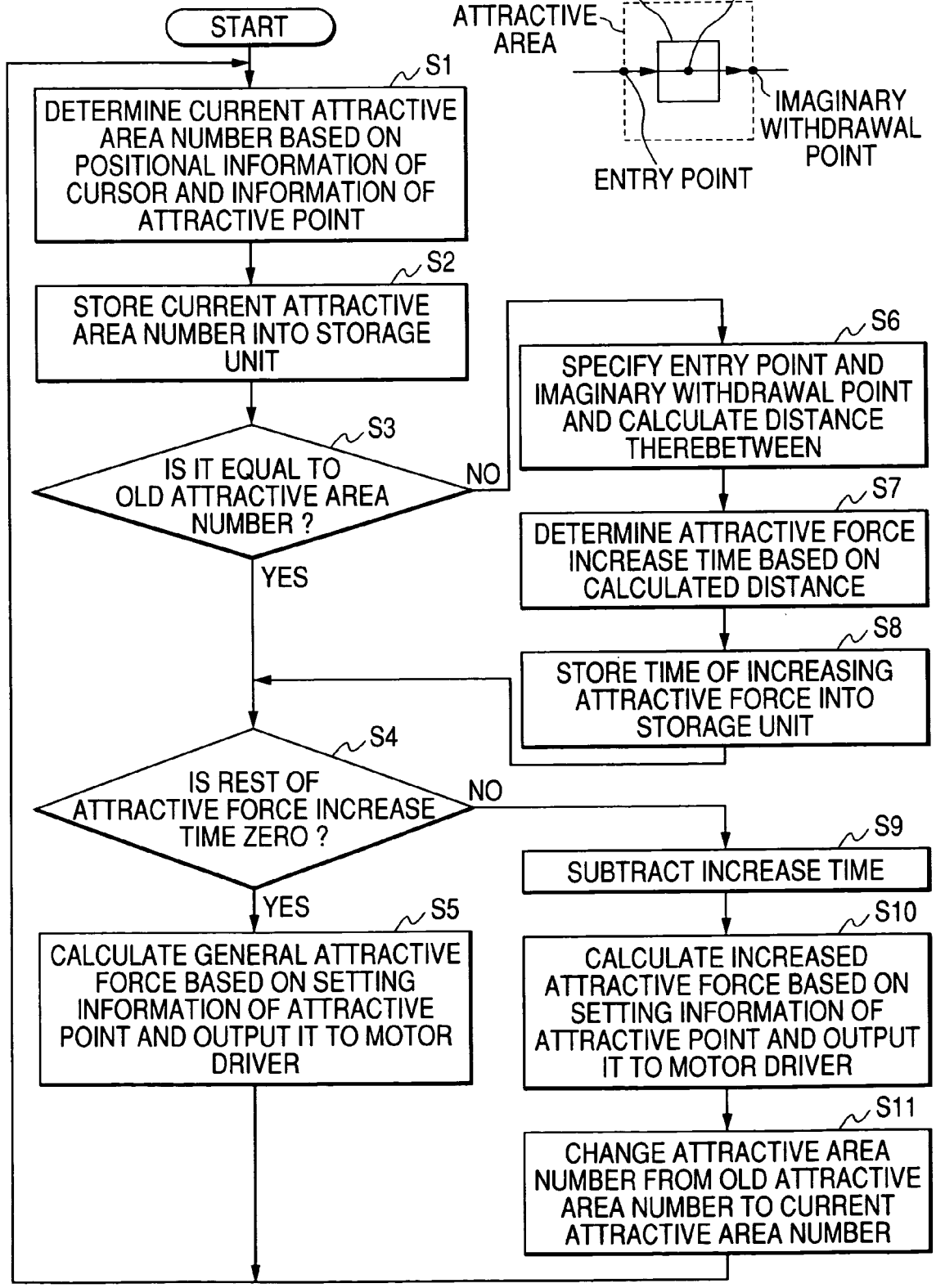
FIG. 6 is a flow chart illustrating the operation of an arithmetic unit.
Figure 7:
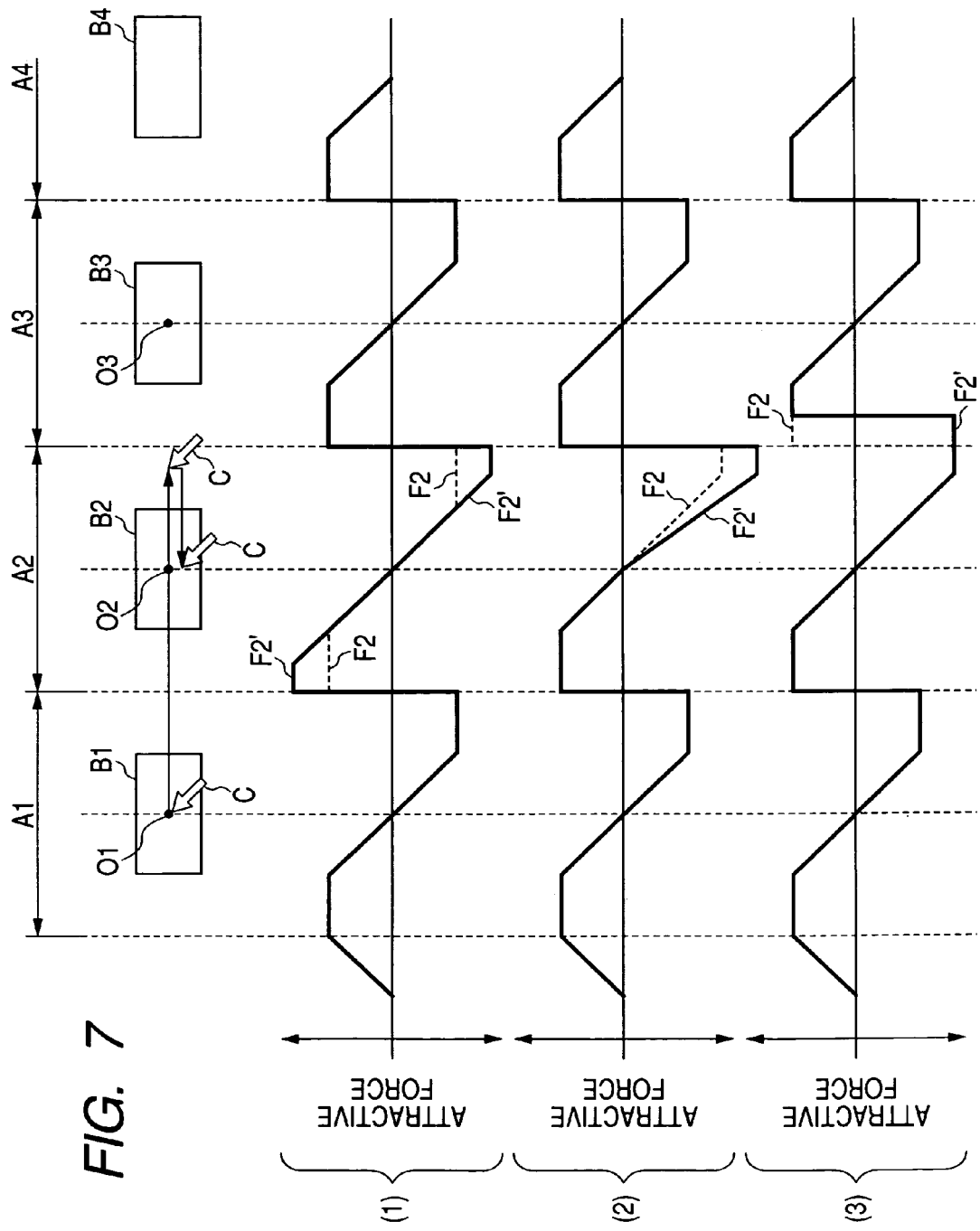
FIG. 7 is a graph illustrating another example of the change in the attractive force in the position of the cursor.
Figure 8:
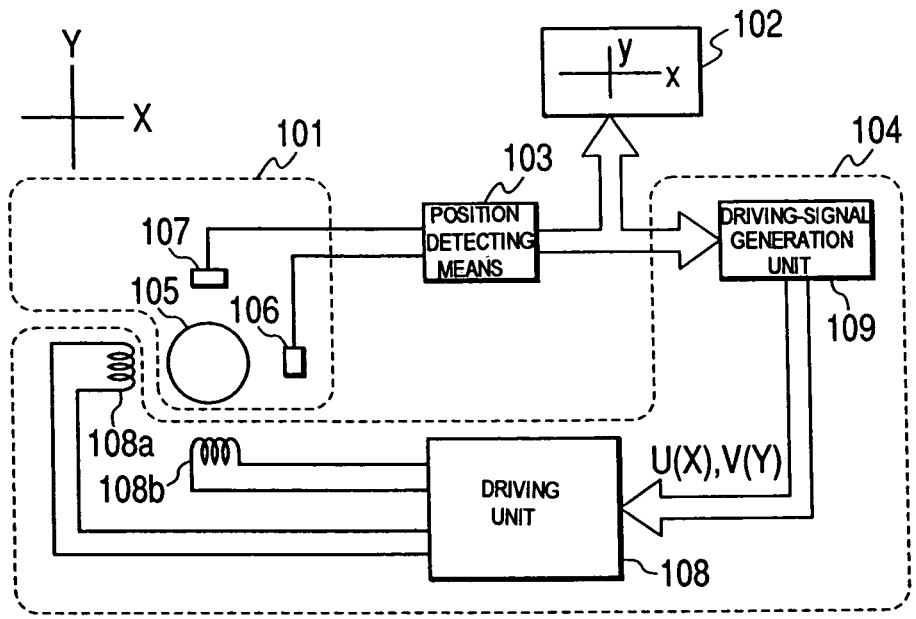
FIG. 8 is a schematic diagram of an input device according to the prior art.
Figure 9:
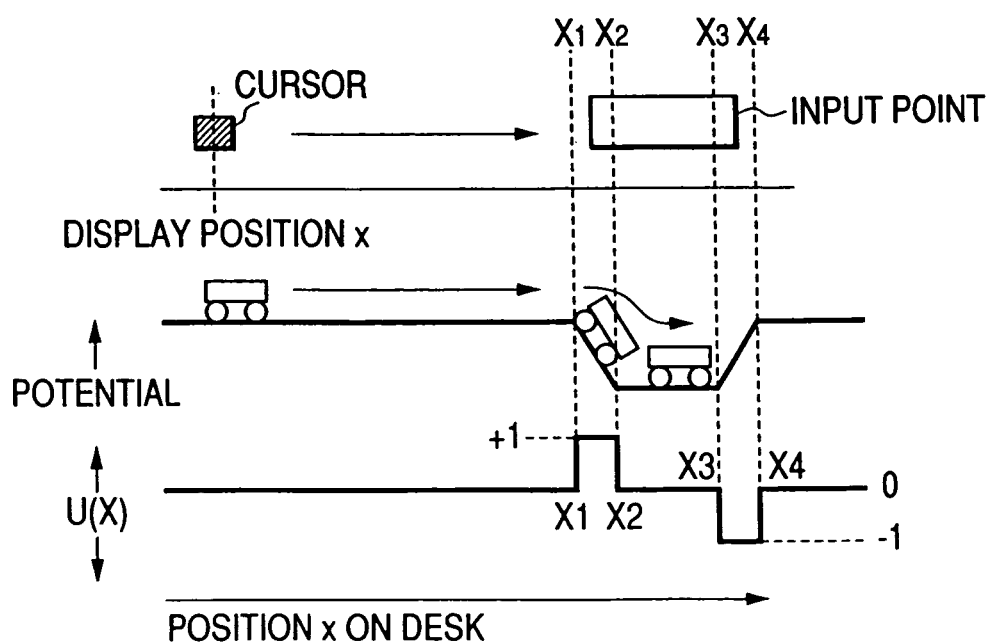
FIG. 9 is an explanatory view illustrating the operation of the input device according to the prior art.
Figure 10:
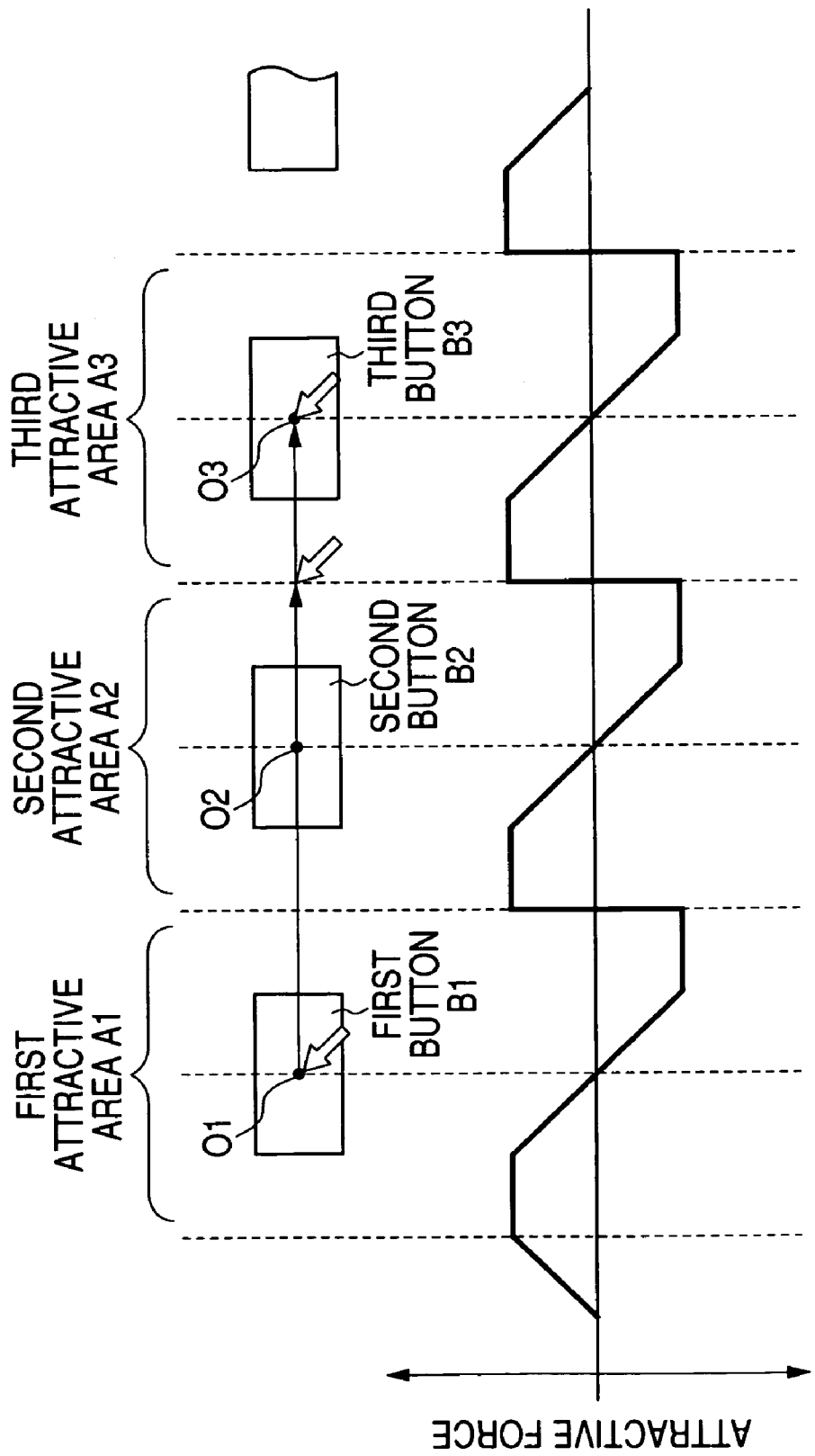
FIG. 10 is a graph illustrating the change in the attractive force when a plurality of buttons is adjacent to one another.

Hereinafter, the embodiment of the haptic input device according to the present invention will be described with reference to FIGS. 1 to 7. FIG. 1 is a schematic diagram of the haptic input device according to the present embodiment, and FIG. 2 is a side cross-sectional view of the input means according to the present embodiment, and FIG. 3 is a plan cross-sectional view illustrating of the input means according to the present embodiment, and FIG. 5 is a graph illustrating the change in the attractive force applied to the operating unit to the position of the cursor, and FIG. 6 is a flow chart illustrating the operation of the arithmetic unit, and FIG. 7 is a graph illustrating another example of the change in the attractive force applied to the operating unit to the position of the cursor.

As shown in FIG. 1, the haptic input device of the present embodiment includes display means 1 for displaying required images including a cursor C and a plurality of buttons B1 to Bn, input means 2 for moving the cursor C displayed on the display means 1 and selecting one of the buttons B1 to Bn displayed on the display means 1, control means 3 for controlling the display means 1 and the input means 2, and storage means 43 that is a part of the control means.

A liquid crystal display, for example, is used as the display means. In addition, the coordinates of the cursor C and the buttons B1 to Bn are determined assuming that the horizontal direction of the display means 1 and the vertical direction of the display means 1 are the x-axis and the y-axis, respectively. Further, as shown in FIG. 5, cursor-attractive areas A1 to An are set around each button B1 to Bn, and only when the cursor C moves to the attractive areas A1 to An, first and second feedback force-generation units 23, 24 are driven and then the cursor C is attracted to the center position of the button that is displayed closest to the cursor C. In addition, the cursor C is displayed by the control means in accordance with the indicating position stored in the storage means, and each button B1 to Bn is displayed by the control means in accordance with a plurality of functional areas stored in the storage means.

As shown in FIG. 1, the input means 2 comprises a mechanism unit 21 having a pivoted lever 21a, an operating unit 22 attached to a top end of the pivoted lever 21a, a first and a second feedback force generation motor 23, 24 for providing an attractive force to the operating unit 22 via the pivoted lever 21a, and first and second detecting units 25 and 26 for detecting an amount of operational movement of the pivoted lever 21a in two perpendicular directions.

As shown in FIGS. 2 to 3, the mechanism unit 21 comprises the pivoted lever 21a, a casing 31, a lever-holding shaft 32 and a swing arm 33 both of which are rotatably supported by the casing 31. The lever-holding shaft 32 and the swing arm 33 are orthogonally disposed to each other, and the pivoted lever 21a is attached to the lever-holding shaft 32 so as to rotate only in the rotational direction of the swing arm 33. In addition, a reference numeral 21b in the drawing denotes a central shaft of a pivotal movement of the pivoted lever 21a. On the other hand, a long slit 33a is formed in the swing arm 33, and a lower end of the pivoted lever 21a passes through. The width of the long slit 33a is slightly larger than the diameter of the lower end of the pivoted lever 21a. The lower end of the pivoted lever 21a can freely swing in the long slit 33a when the pivoted lever 21a swings in the direction (X-X direction) in which the pivoted lever 21a swings bases on the rotation of the lever holding shaft 32, and the swing arm 33 can freely swing with a pivoted lever 21a as one unit when the pivoted lever 21a swings in the direction (Y-Y direction) in which the pivoted lever 21a swings based on the rotation of the central shaft axis 21b rotates.

Thus, the pivoted lever 21a can swing in any direction about the lever-holding shaft 32 and the central shaft 21b. The lever-holding shaft 32 rotates by an amount of rotation in proportion to an amount of pivotal movement of the pivoted lever 21a in the X-X direction. The swing arm 33 rotates by an amount of rotation in proportion to an amount of pivotal movement of the pivoted lever 21a in the Y-Y direction.

The operating unit 22 has a shape and a size that an operator can manipulate, and a selection switch 22a of the buttons B1 to Bn displayed on the display means 1 is set up on a part of the operating unit 22.

A first feedback force generating motor 23 is coupled with the above-described lever holding shaft 32, and drives the operating unit 22 in the X-axis direction of the display means 1. In contrast, the second feedback force generating motor 24 is coupled with the swing arm 33, and drives the operating unit 22 in the Y-axis direction of the display means 1.

A first and a second detecting units 25, 26 are coupled with the rotational axes of the feedback generation units 23, 24, and detect the rotating amount and the rotational direction of the rotational shaft, and output electric signals in accordance with the detected results. A rotary encoder may be used as the first and second detecting unit.

As shown in FIG. 1, the control means 3 includes an input unit 41 receiving in a first operating amount signal a outputted from the first detecting unit 25, a second operating amount signal b outputted from the second detecting unit 26, and a switch signal c outputted from the selection switch 22a, an arithmetic unit 42 for calculating the moving direction and the moving amount of the cursor C based on the first and the second operating amount signals a, b, and for calculating the driving signals d, e of the first and the second feedback force generation motor 23, 24 based on the first and the second operating amount signals a, b, and for switching displayed images based on the switching signals c; a storing unit 43 for storing formulae and coefficients for the calculation, the coordinates of the indicating position in accordance with the cursor C, the coordinates of the plurality of the functional areas in accordance with the button B1 to Bn, the coordinates of the cursor-attractive areas A1 to An and the coordinates of the attractive points O1 to On, etc.; first and second driver circuits 44, 45 for driving the first and the second feedback generating motor 23, 24 by outputting feedback force generating motor driving electric power g and h in accordance with feedback generation motor driving signals d, e outputted from the arithmetic unit 42; a third driver circuit 46 for driving the display means 1 by outputting display means driving electric power i in accordance with display means driving signals f outputted from the arithmetic unit 42; and a CPU 47 for controlling the above-described units 41 to 46.

Figure 4:
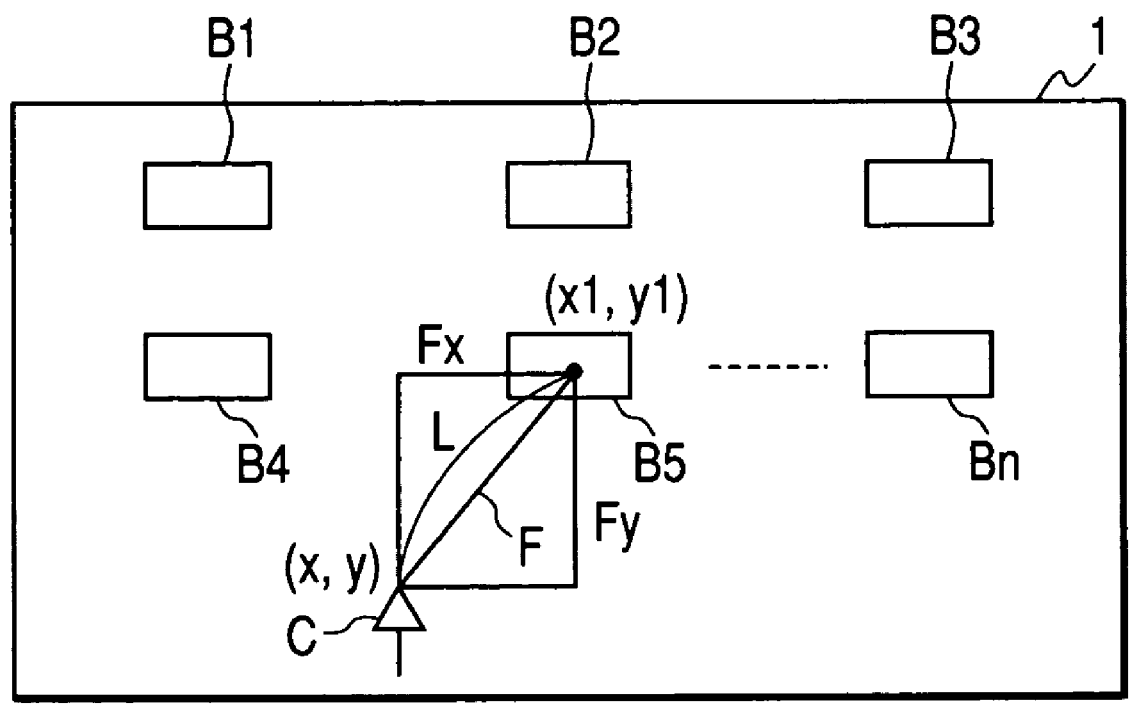
FIG. 4 is an explanatory view illustrating the operation of the haptic input device according to the present embodiment.

As shown in FIG. 4, the arithmetic unit 42 calculates the coordinate of the indicating position, the moving direction and the moving amount based on the first positional signal a, the second positional signal b, formulae and coefficients etc. stored in the storage unit 43 when the operating unit 22 is operated, and the CPU moves the cursor C displayed on the display means 1 by the operational amount of the operating unit 22 in the direction corresponding to the operational direction of the operating unit 22 based on the calculation result.

In addition, as shown in FIG. 4, the arithmetic unit 42 finds a button displayed at the closest position to the current position of the cursor C (in the case of FIG. 4, button B5) based on the coordinate (x, y) of the current position of the cursor C and the coordinate (x1, y1) of the center position of each button B1 to Bn, and drives the first and the second feedback force generation motor 23, 24 so as to attract the cursor C to the center of the found button.

An attractive force F applied to the operating unit 22 by the first and the second feedback force generation motors so as to attract the cursor C to the center of the buttons B1 to Bn, which will be described as the button B1 of FIG. 5 for example, is set to increase linearly with respect to the distance from the center position of the button B1 in the section from the center position O1 of the button B1 to the predetermined radial position P1, and to remain constant in the section from the predetermined radial position P1 to the predetermined position P2, and to decrease linearly in the section farther than the predetermined position P2.

On two adjacent buttons B1, B2 displayed on the display means 1, as shown in the upper part (1) of FIG. 5, when the cursor C is moved from the center position O1 of the button B1 to the center position O2 of the button B2, as shown in the middle (2) of FIG. 5, the attractive force exerted in the direction opposite to the moving direction of the cursor C in the second attractive area A2 is increased larger than the normal attractive force F2 and finally to be F2'. This can prevent the cursor C from moving out to the outside of the attractive area formed around the desired button (in the case of FIG. 5, button B2). In addition, the increase rate of the attractive force may be arbitrarily set up in consideration of the smooth operation of the operating unit 22 and the easiness of the required cursor C movement to buttons, however, the increase rate is preferably 20 to 50% of the normal attractive force as known from the experiments. In addition, the increment time of the attractive force may be arbitrarily set up in consideration of the size of the buttons B1 to Bn displayed on the display means 1 or the operating speed of the operating unit 22, however, the speed is preferably 100 to 200 ms as known from the experiments.

The attractive force in the second attractive area A2 increases when the cursor C moves from the first attractive area A1 to the second attractive area A2, and after the given increment time, the attractive force is restored as the predetermined normal attractive force. Therefore the cursor C can be moved out of the current attractive area with a normal force after the given increment time elapses.

Hereinafter, the operation of the arithmetic unit 42 will be described with reference to the flow chart in FIG. 6.

Firstly, the number of the current attractive area (the current attractive area number) where the cursor C is located at the present is determined based on the positional information of the cursor C detected by the first and second detecting units 25, 26 and the coordinate information of each attractive area A1~An stored in the storage unit 43 (step S-1), and then the determined current attractive area number is stored in the storage unit 43 (step S-2). After that, whether the determined current attractive area number is equal to the attractive area number previously stored in the storage unit 43 (the old attractive area number) is determined (step S-3), and then, preceding to step S-4 if the both numbers are equal to each other, whether the attractive force increment time previously stored in the storage unit 43 is zero is determined.

If the current attractive area number is equal to the old attractive area number in step S-3, and the attractive force increment time is zero in step S-4, the operator can be considered to have an intention to position the cursor C at the attractive point of the current attractive area number, thus the normal attractive force |F1| previously determined based on the positional information of the cursor C, the coordinate information of the attractive areas A1 to An and the attractive point O1 to On that are stored in the storage unit 43, formulae and coefficients is calculated, and is outputted to the motor drivers 44, 45 (step S-5).

If the current attractive area number is not equal to the old attractive area number in step S-3, the coordinate of the end of the cursor entry point of the attractive area that is identified by the current attractive area number (entry point) and the coordinate of the end of the cursor withdrawal point of the attractive area (imaginary withdrawal point) are specified to calculate the distance between the both points (step S-6), and then the attractive force increment time is determined in accordance with the calculated distance between the both points (step S-7), and then the determined attractive force increment time is stored in the storage unit 43 (step S-8). After that, preceding to step S-4, whether the attractive force increment time stored in the storage unit 43 is zero is determined.

If the current attractive area number is not equal to the old attractive area number in step S-3, and the attractive force increment time is not zero in step S-4, the cursor C is likely to move to the other attractive area from the attractive area of the current attractive area number. Thus, after reducing the attractive force increment time (step S-9), the increased attractive force is calculated based on the position information of the cursor C, the coordinate information of each attractive area A1 to An and attractive point O1 to On stored in the storage unit 43, formula and coefficients etc., and is outputted to the motor drivers 44, 45 (step S-10). Consequently, the attractive area number stored in the storage unit 43 is changed to the current attractive area number (step S-11), and the above-mentioned operation is repeated.

As mentioned above, in the input device according to the above-described embodiment, when the cursor C moves from the first attractive area A1 that attracts the cursor C to the first button B1 displayed on the display means 1 to the second attractive area A2 that attracts the cursor C to the second button B2 displayed on the display means 1, the control means 3 increases the attractive force that attracts the cursor C to the second button B2 larger than the predetermined normal attractive force. Therefore even when the operator continues to exert force on the operation unit 22 to overcome the attractive force (resistive force) of the first attractive area A1 after the cursor C crosses the borderline between the first attractive area A1 and the second attractive area A2, the attractive force (resistive force) of the second attractive area A2 on the borderline between the first attractive area A1 and the second attractive area A2 is increased, and thus the cursor C can be prevented from deviating from the second attractive area A2.

In addition, in the input device according to the above-described embodiment, the increment time of the attractive force exerted toward the second button B2 is set whenever the cursor C moves from the first attractive area A1 to the second attractive area A2, and the attractive force exerted toward the second button B2 is restored to the normal attractive force after the increment time elapses, thus the cursor C can be moved out of the current attractive area with a normal force after the increment time.

In addition, in the input device according to the above-described embodiment, among the attractive forces exerted toward the second button B2, only the attractive force exerted in the direction opposite to the moving direction of the cursor C is increased to be larger than the normal attractive force F2, and the attractive force exerted in the moving direction of the cursor C is maintained to the predetermined given attractive force, thus when the cursor C moves from the first attractive area A1 to the second attractive area A2, the attractive force (propulsive force) of the second attractive area A2 exerted on the operating unit 22 is not increased, and thus the cursor C can be prevented more easily from deviating from the second attractive area A2.

In addition, in the input device according to the above-described embodiment, the attractive force increment time is determined in accordance with the distance between the entry point and the imaginary withdrawal point of the cursor C in the second attractive area A2, thus a stable operational sensation can be obtained at all time regardless of the size of the buttons displayed on the display means 1.

In addition, in the above-described embodiment, among the attractive force exerted toward the second button B2, only the attractive force exerted in the direction opposite to the moving direction of the cursor C is increased to be larger than the given attractive force F2. However, as shown in the upper part (1) of FIG. 7, both of the attractive force exerted in the direction opposite to the moving direction of the cursor C and the attractive force exerted in the moving direction of the cursor C may be increased to be larger than the normal attractive force.

In addition, in the above-described embodiment, among the attractive force exerted toward the second button B2, the attractive force is increased only in the section that the attractive force is set constant, however, as shown in the middle part (2) of FIG. 7, the attractive force may be increased to be larger than the normal attractive force also in the section that the attractive force is set to increase.

In addition, as shown in the lower part (3) of FIG. 7, the attractive force may be increased by extending the attractive force-applying section.

In addition, in the description of the present embodiment, for the easy understanding, the calculating of the attractive force by the arithmetic unit 42 is performed based on the coordinate of the cursor C and the coordinate of the center position of each button B1 to Bn. However, more specifically, the calculating of the attractive force by the arithmetic unit 42 is performed based on the coordinate of the indicating position stored in the storage means and the coordinates of the plurality of the functional areas, and the cursor C and the buttons B1 to Bn are displayed based on these coordinates.

In addition, in the present embodiment, an input device includes the display means that displays the cursor C continually moving in accordance with the operation of the operating unit and a plurality of buttons. However, the present invention is not limited thereto. The present invention can be applied to an input device in which the selective-displays of the buttons moves one after another in accordance with the operation of the operating unit. Also the present invention can be applied to a blind-type input device having no display means.

What is claimed is:

1. A haptic input device comprising:
    display means for displaying a cursor and a plurality of buttons;
    input means having an operating unit, an operating amount-detecting unit for detecting an operating amount of the operating unit, and an actuator for applying a required feedback force to the operating unit; and
    control means for controlling the display of the cursor based on the operating amount signals from the operating amount-detecting unit and for controlling driving of the actuator so as to apply a given attractive force exerted toward one of the buttons to the operating unit based on the positional relationship between the cursor and the buttons,
    wherein when the cursor moves from a first attractive area that attracts the cursor to a first button displayed on the display means to a second attractive area that attracts the cursor to a second button displayed on the display means, the control means increase the attractive force exerted toward the second button to be larger than a given attractive force by extending the second attractive area during a set increment time.

2. The haptic input device according to claim 1,
    wherein the control means set an increment time of the attractive force exerted toward the second button whenever the cursor moves from the first attractive area to the second attractive area, and the control means restores the attractive force exerted toward the second button to the given attractive force when the increment time elapses.

3. The haptic input device according to claim 1,
    wherein among the attractive force exerted toward the second button, the control means increase only the attractive force exerted in a direction opposite to a moving direction of the cursor larger than the given attractive force.

4. A haptic input device comprising:
    storage means for storing an indicating position and a plurality of functional areas;
    input means having an operating unit, an operating amount-detecting unit for detecting an operating amount of the operating unit, and an actuator for applying a required feedback force to the operating unit; and
    control means for calculating the indicating position based on the operational amount and for controlling driving of the actuator to apply a given attractive force exerted toward one of the functional areas to operating unit based on the positional relationship between the indicating position and the one of the functional areas,
    wherein when the indicating position moves from a first attractive area that attracts the indicating position to a first functional area to a second attractive area that attracts the indicating position to a second functional area, the control means increase the attractive force exerted toward the second functional area to be larger than the given attractive force by extending the second attractive area during a set increment time.

5. The haptic input device according to claim 4,
    wherein the control means set an increment time of the attractive force exerted toward the second functional area whenever the indication position moves from the first attractive area to the second attractive area, and the control means restores the attractive force exerted toward the second functional area to the given attractive force when the increment time elapses.

6. The haptic input device according to claim 5,
    wherein among the attractive force exerted toward the second functional area, the control means increase only the attractive force exerted in a direction opposite to a moving direction of the indicating position to be larger than the given attractive force.

7. A haptic input device comprising:

display means for displaying a cursor and a plurality of buttons;

input means having an operating unit, an operating amount-detect unit for detecting an operating amount of the operating unit, and an actuator for applying a required feedback force to the operating unit; and control means for controlling the display of the cursor based on the operating amount signals from the operating amount-detecting unit and for controlling driving of the actuator so as to apply a given attractive force exerted toward one of the buttons to the operating unit based on the position relationship between the cursor and the buttons, wherein when the cursor moves from a first attractive area that attracts the cursor to a first button displayed on the display means to a second attractive area that attracts the cursor to a second button displayed on the display means, the control means increase the attractive force exerted towards the second button so that a maximum magnitude of the force exerted towards the second button is greater than a maximum magnitude of a force exerted towards the first button.

* * * * *

UNITED STATES PATENT AND TRADEMARK OFFICE
CERTIFICATE OF CORRECTION

PATENT NO. : 7,463,240 B2　　　　　　　　　　　　　　　　　　　　Page 1 of 1
APPLICATION NO. : 11/070753
DATED : December 9, 2008
INVENTOR(S) : Ken Matsumoto et al.

It is certified that error appears in the above-identified patent and that said Letters Patent is hereby corrected as shown below:

In column 10, claim 1, line 16, after "the control means" replace "increase" with --increases--.

In column 10, claim 2, line 21, after "the control means" replace "set" with --sets--.

In column 10, claim 3, line 29, after "the control means" replace "increase" with --increases--.

In column 10, claim 4, line 50, after "the control means" replace "increase" with --increases--.

In column 10, claim 5, line 55, after "the control means" replace "set" with --sets--.

In column 10, claim 6, line 64, after "the control means" replace "increase" with --increases--.

In column 11, claim 7, line 7, before "unit for detecting" replace "amount-detect" with --amount-detecting--.

-In column 12, claim 7, line 8, after "the control means" replace "increase" with --increases--.

Signed and Sealed this

Twenty-fourth Day of November, 2009

David J. Kappos
*Director of the United States Patent and Trademark Office*